Oct. 20, 1970  TOMISABURO OKUMURA  3,535,635

METHOD AND APPARATUS FOR MEASURING NOISE IN AN ACTIVE ELEMENT

Filed May 17, 1967

INVENTOR

*Tomisaburo Okumura*

BY *Stevens, Davis, Miller & Mosher*

ATTORNEYS

United States Patent Office 3,535,635
Patented Oct. 20, 1970

3,535,635
METHOD AND APPARATUS FOR MEASURING NOISE IN AN ACTIVE ELEMENT
Tomisaburo Okumura, Kyoto-shi, Japan, assignor to Matsushita Electronics Corporation, Osaka, Japan
Filed May 17, 1967, Ser. No. 639,128
Claims priority, application Japan, May 23, 1966, 41/33,431
Int. Cl. G01r 31/22
U.S. Cl. 324—158
3 Claims

ABSTRACT OF THE DISCLOSURE

This application is directed to a method for measuring noise in an active element, wherein the noise output voltage is first measured for more than two capacitive values provided as a signal source impedance to determine whether the element is free from a noise current source and second the noise output voltage is measured for more than two resistive values provided as a noise voltage source in order to determine the noise figure or the equivalent noise resistance from the data obtained.

---

The present invention provides a method for accurately measuring the noise existing in active elements having a high input impedance such as a field-effect transistor and a vacuum tube, etc., and is characterized by making such a very accurate noise measurement feasible.

Noise sources existing on the input side of an active circuit under test can be classified according to whether or not they depend on the signal source impedance, namely, a noise current source and a noise voltage source for the former and the latter cases, respectively. Active elements under test which permit no current flow through the input circuit thereof are obviously free from any noise current source and contain only a noise voltage source therein. A noise voltage source can be expressed by an equivalent noise resistance which is interpreted to generate the same magnitude of noise voltage as that of the voltage source.

It is therefore an object of the present invention to provide a novel method for measuring noise in active elements in which the measurement will have a high degree of accuracy.

The means for accomplishing the foregoing objects and other advantages, which will be apparent to those skilled in the art are set forth in the following specification and claims, and are illustrated in the accompanying drawings dealing with a basic embodiment of the present invention.

Reference is made now to the drawings in which:

FIG. 1 shows an equivalent noise resistance $r_{eq}$, an active circuit or element 1 having no noise source, and a signal source resistor $R_i$.

Figure 1:
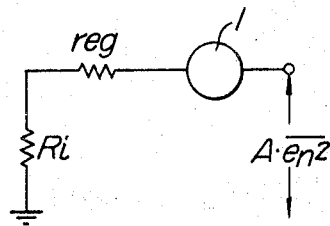
FIG. 1 shows schematically an equivalent circuit of a noise source in an active element under test.

The noise figure of the circuit shown in FIG. 1 is (1) $$nf = 1 + \frac{r_{eq}}{R_i}$$

The logarithm expression conventionally used in engineering is (2) $$NF = 10 \log \left(1 + \frac{r_{eq}}{R_i}\right) db$$

Figure 2:
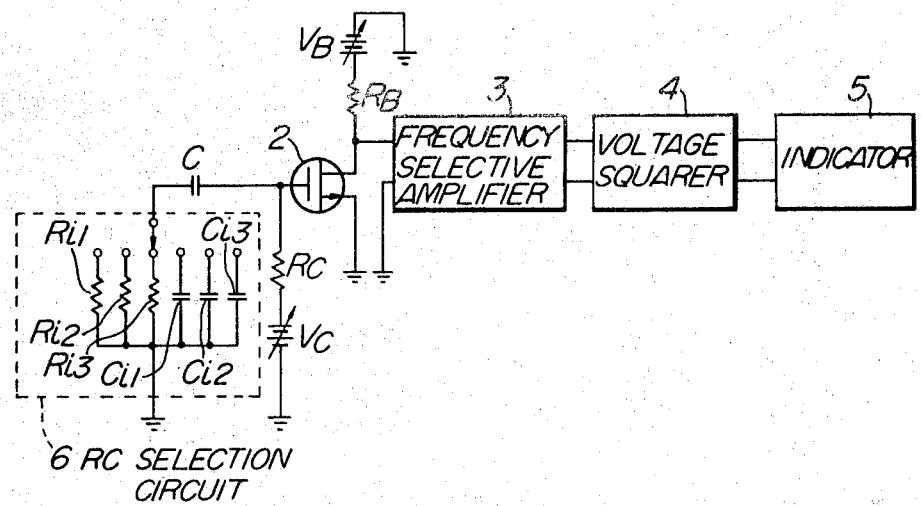
FIG. 2 is a schematic diagram of an active circuit for noise measurement according to the present invention.

The mean square noise voltage $\overline{e^2_n}$ in the circuit shown in FIG. 2 is expressed by (3) $$A \cdot \overline{e^2_n} = 4kT(R_i + r_{eq})B \cdot A$$

where A is the amplification gain of the active element, $k$ is the Boltzmann's constant, T is the absolute temperature of the resistor $R_i$, and B is the band width.

If the value of $\overline{e^2_n}$ is expressed by $\overline{e^2_{n1}}$, $\overline{e^2_{n2}}$, $\overline{e^2_{n3}}$ ... $\overline{e^2_{nn}}$ accordingly as the value of $R_i$ is varied $R_{i1}$, $R_{i2}$, $R_{i3}$ ... $R_{in}$ respectively, the result is (4) $$\overline{e^2_{n1}} = 4kT(R_{i1} + r_{eq})B$$

(5) $$\overline{e^2_{n2}} = 4kT(R_{i2} + r_{eq})B$$

(6) $$\overline{e^2_{nn}} = 4kT(R_{in} + r_{eq})B$$

Equations 4 and 5 are combined as follows:

(7) $$\frac{\overline{e^2_{n1}}}{\overline{e^2_{n2}}} = \frac{R_{i1} + r_{eq}}{R_{i2} + r_{eq}}$$

Denoting $$p = \frac{\overline{e^2_{n1}}}{\overline{e^2_{n2}}}$$

then substitution results in (8) $$r_{eq} = \frac{pR_{i2} - R_{i1}}{1 - p}$$

Since $R_{i1}$ and $R_{i2}$ are known, $r_{eq}$ can be easily calculated from $p$ or $$\frac{\overline{e^2_{n1}}}{\overline{e^2_{n2}}}$$

Equation 8 contains neither the band width nor the amplification gain of the active element. Therefore, it is clear that the determination of $r_{eq}$ with the aid of Equation 8 is very convenient.

However, an important thing is that the quantities to be measured in practice are $\overline{e^2_{n1}}$ and $\overline{e^2_{n2}}$ of the left-hand side of Equation 8 multiplied by a common constant therebetween. The multiplication causes no change in the value of $p$.

In order to obtain the value of $r_{eq}$ from Equation 8, it is theoretically sufficient to measure only for two values of $R_i$. In practice, however, due to the fluctuations of the indication inherent to noise measurements, it is better to obtain data for many values of $R_i$ and calculate $r_{eq}$ from the results thereof.

FIG. 2 shows schematically a circuit for measuring noise in an n-channel type MOS transistor 2 under test, including a frequency selective amplifier 3 having a band pass characteristic in a particular frequency range, a squarer 4 giving an output proportional to the square of the input thereof, an output indicator 5, and an RC selection circuit 6.

The selection circuit 6 includes signal source resistors $R_{i1}$, $R_{i2}$ and $R_{i3}$ having different values of resistance and capacitors $C_{i1}$, $C_{i2}$, and $C_{i3}$ having different values of capacitance. The impedance of the frequency selective amplifier 3 at a tuned frequency has a certain value within or beyond the range between the maximum value and the minimum value of the signal source resistors $R_i$. $V_c$ is a power supply for biasing the MOS transistor 2 under test, and $R_c$ is resistor therefor having a resistance far greater than the maximum resistance or impedance of resistance $R_i$ and capacitors $C_i$. C is a capacitor for blocking a DC current and is characterized by having an impedance much less than that of resistors $R_i$ and capacitors $C_i$. $R_B$ is a load resistor for transistor 2 and $V_B$ is a power source drain therefor.

It should be noted that FIG. 2 shows only three resistors $R_i$ and three capacitors $C_i$. This is only exemplary and the number of resistors $R_i$ and capacitors $C_i$ is not necessarily three nor do they need to be equal in number.

By the circuit arrangement shown in FIG. 2, a frequency to be measured is defined by a tuned frequency of the frequency selective amplifier. A noise voltage squared by voltage squarer 4 and proportional to $\overline{e^2}_n$ is derived and indicated at indicator 5.

This indicated value being proportional to $\overline{e^2}_n$ may be substituted in the left-hand side of Equation 7. However, an assumption is made in calculating $r_{eq}$ from Equation 8 that $r_{eq}$ is independent of the signal source impedance $R_i$. The capacitors $C_i$ are provided to examine the validity of this assumption.

Since a capacitor contains no noise, the noise voltage which is indicated by the output indicator 5 when the gate of MOS transistor is switched from resistor $R_i$ to capacitors $C_i$ is to be interpreted as a noise voltage arising from the transistor itself. Hence, if $r_{eq}$ is independent of the signal source impedance, the output indicated by indicator 5 should not change with the variation of capacitance from $C_{i1}$ to $C_{i3}$.

If $r_{eq}$ is shown to be a constant or more precisely if it is shown that $r_{eq}$ can be treated as a constant within the range of impedance corresponding to capacitance between $C_{i1}$ and $C_{i3}$ or within the range of resistance between $R_{i1}$ and $R_{i3}$, $r_{eq}$ may be safely calculated from Equations 7 and 8. The noise figure may be calculated from Equations 1 and 2. If the equivalent noise resistance or the noise figure is once determined, it is obvious that other expressions for noise are immediately derived therefrom.

A practical working embodiment of the subject invention will be discussed herebelow:

In order to make a noise measurement of an n-channel type MOS transistor, six resistors having resistances between 50 KΩ and 1.0 MΩ and three capacitors having capacitances between 0.1 µf. and 100 pf. were assembled to form the RC selection circuit. The frequency used for the measurement was 1 kc. and $R_c$ was 10 MΩ. Further, the temperature during measurement was 20° C., the drain current was 0.5 ma., and the voltage between the source and the drain was 5 v. Under these conditions the gate was at first connected with each capacitor $C_i$ to examine whether the deflection of the output indicator 5 varied with impedance of the capacitor. According to the result, no change at all was found in the deflection of the output indicator with $C_i$ being varied from 100 pf. to 0.01 µf., thus showing that $r_{eq}$ was a constant. Next, the gate was connected successively with six resistors $R_i$ and $r_{eq} = 968 KΩ$ was obtained using the method of averages. The noise figure for the case of $R_i = 1 MΩ$ was calculated to be 2.94 db, which agreed well with that of another noise measuring method showing 2.72 db. In view of the principle of the measurement, however, the present method was considered to be more accurate.

As evident from the foregoing explanation, using a number of capacitors $C_i$ is not essential to the measurement of noise. Hence, when it is found by other methods that a noise current source in the active element under test is negligible, it is not necessary to use capacitors $C_i$ one by one to examine the influence of the noise current source. However, use of capacitors $C_i$ has another important function which is to examine whether $r_{eq}$ is a constant.

Although the embodiment relates to an n-channel type MOS transistor, it is evident that the present invention may generally be applied to any such insulated gate transistor as a p-channel type MOS transistor, a junction gate field effect transistor, a vacuum tube, and moreover, even an active element having a much lower input impedance.

The applicable range of the present method to an active element is related to and determined by the input resistance thereof. When the signal source impedance is low, the noise voltage arising from a noise current source is negligible compared to that arising from a noise voltage source even if the input resistance of the element is low. In such a case it may be considered that, within a particular range of resistance, the element contains only a noise voltage source.

According to the above-described method, $r_{eq}$ calculated from Equations 7 and 8 is substituted in the right-hand side of Equations 1 and 2 to obtain the noise figure $nf$ therefrom. However, in order to obtain $nf$ directly without calculating $r_{eq}$, the following equations may be used, which are obtained by combining Equations 8 with Equation 1 or Equation 2.

(9)
$$nf = 1 + \frac{pR_{i2} - R_{i1}}{(1-p)R_{ir}}$$

(10)
$$NF = 10 \log \frac{pR_{i2} - R_{i1}}{(1-p)R_{ir}}$$

where $R_{ir}$ is the signal source impedance under measurement.

Theoretically, $nf$ or $NF$ can be obtained from the data for two cases of $R_i$. However, as explained before in obtaining $r_{eq}$, it is more accurate to make measurements for many values of a signal source impedance and obtain the value of $p$ therefrom to derive $nf$ or $NF$.

With regards to the methods of determining the value of $p$ from a great amount of data, the following methods are available, i.e., the selected point method, which plots the outputs of the indicator on rectangular coordinates to determine a straight line such that a nearly equal number of points are located on both sides of the line whose slope will give the value of $p$; the method of average, which divides data into two groups which are nearly equal in number and determines the weight points of each group to draw a straight line passing therethrough and obtain the slope $p$; and the method of least square, applied to draw a straight line and get the slope $p$ thereof.

As shown above, the equations given here can be transformed to various forms in accordance with the application thereof.

The gist of the present invention is to use more than two input resistors to obtain the outputs of the mean square noise voltage or the quantities proportional thereof, from which the noise figures and the equivalent noise resistance are calculated using Equations 1, 2, 8, 9, and 10 or the equations equivalent thereto. However, it is evident that other methods being different from in the final expression thereof but essentially the same as the present method are included in the scope of the present invention.

The other feature of the present invention is to use the reactance of a plurality of capacitors as the signal source impedance in order to decide whether or not an active element may be considered to contain only a noise voltage source or whether or not the equivalent noise resistance is independent of a signal source impedance within a particular range of the signal source impedance. It is to be noted here that a shunt resistor having a resistance much larger than the reactance of these capacitors should be inserted in parallel therewith.

As evident from the foregoing explanation of the noise measuring method of an active element, the present method may be applied not only to a single element but also to an active circuit when the equivalent noise resistance in the circuit may be considered to be a constant.

What is claimed is:

1. A method for measuring noise in an active element mounted in a test circuit comprising a frequency selective amplifier connected to an output of said element and having a band pass characteristic in a particular frequency range, means to square the output of said amplifier proportional to the square of the input thereof, output indicating means connected to said squaring means, a plurality of capacitive means connected to vary the noise current source of said element and a plurality of resistive means connected to vary the noise voltage source of said element comprising the steps of energizing said active element, connecting at least two values of the capacitive means to said active element to determine the effect of the noise current source on said element and connecting at least two values of said resistive means to said active element to measure the mean square noise voltages and calculating the equivalent noise resistance of said element from the ratio of the data obtained.

2. An apparatus for measuring noise in an active element comprising a frequency selective amplifier connected to an output of said element and having a band pass characteristic in a particular frequencey range, means to square the output of said amplified proportional to the square of the input thereof, output indicating means connected to said squaring means, a plurality of capacitive means and a plurality of resistive means, switching means for selectively connecting said capacitive and said resistive means to said active element to determine the effect of a noise element to current source on said element and to measure a mean square noise output value respectively to thereby calculate the equivalent noise resistance of said element from the ratio of the data obtained.

3. A method of measuring noise in an active element comprising the steps of energizing the active element, connecting a first signal source pure resistive element having a known resistance value $R_{i1}$ to an input end of said active element under test to measure a mean square noise output voltage $\overline{e^2}/_{n1}$ of said active element, connecting a second signal source pure resistive element having another known resistance value $R_{i2}$ to said input end of the active element by switching from said first source resistive element thereto to measure another mean square noise output voltage $\overline{e^2}_{n2}$ of said active element, and calculating the equivalent noise resistance $r_{eq}$ from the ratio of the data obtained $$p = \frac{\overline{e^2}_{n1}}{\overline{e^2}_{n2}}$$

by the equation:

$$r_{eq} = \frac{pR_{i2} - R_{i1}}{1 - p}$$

References Cited

Solid State Design, vol. 4, #1, January 1963, pp. 27–31.

RUDOLPH V. ROLINEC, Primary Examiner

E. L. STOLARUN, Assistant Examiner

U.S. Cl. X.R.

324—57